US00RE39547E

(19) United States
(12) Reissued Patent
Sandhu

(10) Patent Number: US RE39,547 E
(45) Date of Reissued Patent: Apr. 3, 2007

(54) METHOD AND APPARATUS FOR ENDPOINTING MECHANICAL AND CHEMICAL-MECHANICAL POLISHING OF SUBSTRATES

(75) Inventor: Gurtej S. Sandhu, Boise, ID (US)

(73) Assignee: Micron Technology, Inc., Boise, ID (US)

(21) Appl. No.: 10/035,828

(22) Filed: Dec. 28, 2001

Related U.S. Patent Documents

Reissue of:

(64) Patent No.: 6,007,408
Issued: Dec. 28, 1999
Appl. No.: 08/917,665
Filed: Aug. 21, 1997

(51) Int. Cl.
*B24B 1/00* (2006.01)

(52) U.S. Cl. ..... 451/7; 451/41; 451/53; 451/5; 451/8

(58) Field of Classification Search ..... 451/7, 451/53, 41, 60, 5, 6, 8, 285, 289, 488, 526, 451/921; 438/604, 612, 692, 693; 216/88, 216/89

See application file for complete search history.

(56) References Cited

U.S. PATENT DOCUMENTS 4,200,395 A * 4/1980 Smith et al.
4,203,799 A * 5/1980 Sugawara et al.
4,358,338 A * 11/1982 Downey et al.
4,367,044 A * 1/1983 Booth, Jr. et al.
4,377,028 A * 3/1983 Imahashi
4,422,764 A * 12/1983 Eastman
4,640,002 A * 2/1987 Phillips et al.
4,660,980 A * 4/1987 Takabayahsi et al.
4,717,255 A * 1/1988 Ulbers
4,879,258 A * 11/1989 Fisher
5,036,015 A * 7/1991 Sandhu
5,064,683 A * 11/1991 Poon et al.
5,069,002 A * 12/1991 Sandhu et al.
5,081,796 A * 1/1992 Shultz
5,154,021 A * 10/1992 Bombardier et al.
5,216,843 A * 6/1993 Breivogel et al.
5,220,405 A * 6/1993 Barbee et al.
5,314,843 A * 5/1994 Yu et al.
5,324,381 A * 6/1994 Nishiguchi
5,369,488 A * 11/1994 Morokuma
5,399,234 A * 3/1995 Yu et al. ..... 438/14
5,413,941 A * 5/1995 Koos et al.
5,433,651 A * 7/1995 Lustig et al.
5,461,007 A * 10/1995 Kobayashi
5,465,154 A * 11/1995 Levy
5,597,442 A * 1/1997 Chen et al.
5,609,719 A * 3/1997 Hempel
5,616,069 A * 4/1997 Walker et al.
5,643,050 A * 7/1997 Chen
5,663,797 A * 9/1997 Sandhu
5,733,176 A * 3/1998 Robinson et al.
5,762,537 A * 6/1998 Sandhu et al.
5,777,739 A * 7/1998 Sandhu et al.
5,855,804 A * 1/1999 Walker

* cited by examiner

*Primary Examiner*—George Nguyen
(74) *Attorney, Agent, or Firm*—Dorsey & Whitney, LLP

(57) ABSTRACT

An apparatus and method for stopping mechanical and chemical-mechanical polishing of a substrate at a desired endpoint. In one embodiment, a polishing machine has a platen, a polishing pad positioned on the platen, and a polishing medium located at a planarizing surface of the polishing pad. The polishing machine also has a substrate carrier that may be positioned over the planarizing surface of the polishing pad, and at least one heat sensor is coupled to the polishing machine to detect heat at a front side of the substrate. The heat sensor preferably measures a temperature of a component sensitive to heat at the front side of the substrate, such as the planarizing surface of the polishing pad, the back side of the substrate, or the byproducts produced by polishing the substrate. In operation, the heat sensor monitors the heat at the front side of the substrate, and the removal of material from the substrate is stopped when the heat at the front side of the substrate changes from a first heat range to a second heat range.

19 Claims, 4 Drawing Sheets

METHOD AND APPARATUS FOR ENDPOINTING MECHANICAL AND CHEMICAL-MECHANICAL POLISHING OF SUBSTRATES

Matter enclosed in heavy brackets [ ] appears in the original patent but forms no part of this reissue specification; matter printed in italics indicates the additions made by reissue.

TECHNICAL FIELD

The present invention is related to mechanical and chemical-mechanical polishing of substrates, and more particularly, to a method and apparatus for consistently stopping planarization of substrates at a desired endpoint.

BACKGROUND OF THE INVENTION

Chemical-mechanical polishing ("CMP") processes remove material from the surface of semiconductor wafers or other substrates in the production of microelectronic devices and other products. FIG. 1 schematically illustrates a CMP machine 10 with a platen 20, a wafer carrier 30, a polishing pad 40, and a planarizing liquid 44 on the polishing pad 40. The polishing pad 40 and the planarizing liquid 44 may separately, or in combination, define a polishing medium that mechanically and/or chemically removes material from the surface of a wafer. The polishing pad 40 may be a conventional polishing pad made from a continuous phase matrix material (e.g., polyurethane), or it may be a new generation abrasive polishing pad made from abrasive particles fixedly dispersed in a suspension medium. The planarizing liquid 44 may be a conventional CMP slurry with abrasive particles and chemicals that is used with a conventional polishing pad, or the planarizing liquid 44 may be a planarizing solution without atbrasive particles that is used with an abrasive polishing pad.

The CMP machine 10 may also have an under-pad 25 attached to an upper surface 22 of the platen 20 and the lower surface of the polishing pad 40. A drive assembly 26 rotates the platen 20 (indicated by arrow A), or it reciprocates the platen 20 back and forth (indicated by arrow B). Since the polishing pad 40 is attached to the under-pad 25, the polishing pad 40 moves with the platen 20 during planarization.

The wafer carrier 30 has a lower surface 32 to which a wafer 12 may be attached, or the wafer 12 may be attached to a resilient pad 34 positioned between the wafer 12 and the lower surface 32. The wafer carrier 30 may be a weighted, free-floating wafer carrier; or an actuator assembly 36 may be attached to the wafer carrier to impart axial and/or rotational motion to the wafer 12 (indicated by arrows C and D, respectively).

To planarize the wafer 12 with the CMP machine 10, the wafer carrier 30 presses the wafer 12 face-downward against the polishing medium. More specifically, the wafer carrier 30 generally presses the wafer 12 against the planarizing liquid 44 on the planarizing surface 42 of the polishing pad 40, and at least one of the platen 20 or the wafer carrier 30 moves relative to the other to move the wafer 12 across the planarizing surface 42. As the wafer 12 moves across the planarizing surface 42, material is removed from the face of the wafer 12.

In the competitive semiconductor industry, it is desirable to consistently stop CMP processing of a run of wafers at a desired endpoint and to produce a uniform, planar surface on each wafer. Accurately stopping CMP processing at a desired endpoint is important to maintaining a high throughput of planarized wafers because the planarized surface must be at a desired level with respect to other layers of material and structures on the wafer. For example, if the planarized surface is above an acceptable level, the wafer must be re-planarized until it reaches a desired endpoint. Additionally, it is important to accurately produce a uniform, planar surface on each wafer to enable precise circuit and device patterns to be formed with photolithography techniques. The critical dimensions of many photo-patterns must be focused within a tolerance of approximately 0.1 μm. Focusing photo-patterns to such small tolerances, however, is difficult when the planarized surface of the wafer is not uniformly planar. Therefore, two primary objectives of CMP processing are stopping planarizing at a desired endpoint and producing a highly uniform, planar surface on each wafer.

The endpoint of CMP processing may be determined by estimating the time-to-polish the wafer based on the polishing rate of previous wafers. CMP processing, however, involves many operating parameters that affect the planarity of the surface of the wafer and the ability to estimate the time-to-polish a wafer to a desired endpoint. The rate at which the material is removed from the surface of the wafer (the "polishing rate") often varies from one wafer to another. The most common parameters that affect the polishing rate of a wafer are: (1) the relative velocity created between the wafer and the polishing pad across the face of the wafer; (2) the distribution of slurry across the surface of the wafer; (3) the composition of materials of the wafer; (4) the topography of the wafer; (5) the parallelism between the face of the wafer and the surface of the polishing pad; (6) the temperature gradient across the face of the wafer; and (7) the condition of the planarizing surface of the polishing pad. The polishing rate may vary from one wafer to another because it is difficult to identify and correct changes in specific operating parameters. Thus, it is difficult to consistently stop CMP processing at a desired endpoint on a wafer by estimating the time-to-polish the wafer using the polishing rate of previous wafers.

The endpoint of a wafer may also be determined by stopping CMP processing and measuring a change in thickness of the wafer. In a typical process for measuring a change in thickness of the wafer, the wafer is partially or completely removed from the planarizing surface of the polishing pad, and then an interferometer or other measuring device measures a change in thickness of the wafer. However, repeatedly stopping CMP processing to measure the change in thickness of the wafer reduces the throughput of planarized wafers, or a wafer may be destroyed or impaired because it may be over-polished beyond an acceptable endpoint before the first measurement. Accordingly, it is also difficult and time-consuming to consistently stop CMP processing at a desired endpoint by continuously measuring the actual change in thickness of the water.

In light of the problems with determining the endpoint of CMP processing, it would be desirable to develop a method and apparatus that indicates when a wafer has been planarized to a desired endpoint.

SUMMARY OF THE INVENTION

The present invention is an apparatus and method for stopping mechanical and chemical-mechanical polishing of a substrate at a desired endpoint. In an embodiment, a polishing machine has a platen, a polishing pad positioned on the platen, and a polishing medium located at a planarizing surface of the polishing pad. The polishing machine also has a substrate carrier that may be positioned over the planarizing surface of the polishing pad, and at least one sensor that monitors a characteristic of a polishing component that is influenced by the type of material being removed from the substrate. In a preferred embodiment, the sensor is preferably a heat sensor that measures the temperature of a polishing component sensitive to heat at the front side of the substrate, such as the planarizing surface of the polishing pad, the back side of the substrate, or the CMP byproducts produced by polishing the substrate. A single heat sensor, for example, may either be embedded in the polishing pad, connected to the substrate carrier at the backside of the substrate, or attached to the platen at a location where the CMP byproducts flow off of the polishing pad. On the other hand, a plurality of heat sensors may be positioned at different locations on the polishing machine, including a first heat sensor embedded in the polishing pad, a second heat sensor connected to the substrate carrier, and a third heat sensor attached to the platen.

A preferred embodiment of the invention is useful to endpoint CMP processing at the uppermost interface between a cover layer on a substrate and an underlying layer on the substrate covered by the cover layer. At the beginning of the CMP process, the chemical reaction and friction between the cover layer and the polishing medium produces heat between the substrate and the polishing medium within a first heat range. After the cover layer is at least partially removed from the substrate and a portion of the underlying layer engages the polishing medium, the heat between the substrate and the polishing medium changes to within a second heat range because the chemical reaction between the underlying layer and the polishing medium is different than that of the cover layer. The heat may also change when the underlying layer engages the polishing medium because the coefficient of friction between the underlying layer and the polishing medium may also be different than that of the cover layer. The heat sensors sense the change in heat from the first heat range to the second heat range, and CMP processing is preferably stopped when the sensed heat is within the second heat range.

In another embodiment of the invention, a reactive agent is added to the planarizing solution to produce large variations between the first heat range and the second heat range when the underlying layer is exposed to the polishing medium. In still another embodiment of the invention, the CMP byproducts flowing off of the polishing pad are mixed with a reactive agent selected to react with the material of the underlying layer. Thus, by measuring the extent to which the reactive agent reacts with the CMP byproducts, this embodiment detects the presence and concentration of material from the underlying layer in the CMP byproducts to identify the endpoint of the polishing process.

DETAILED DESCRIPTION OF THE INVENTION

Figure 2:
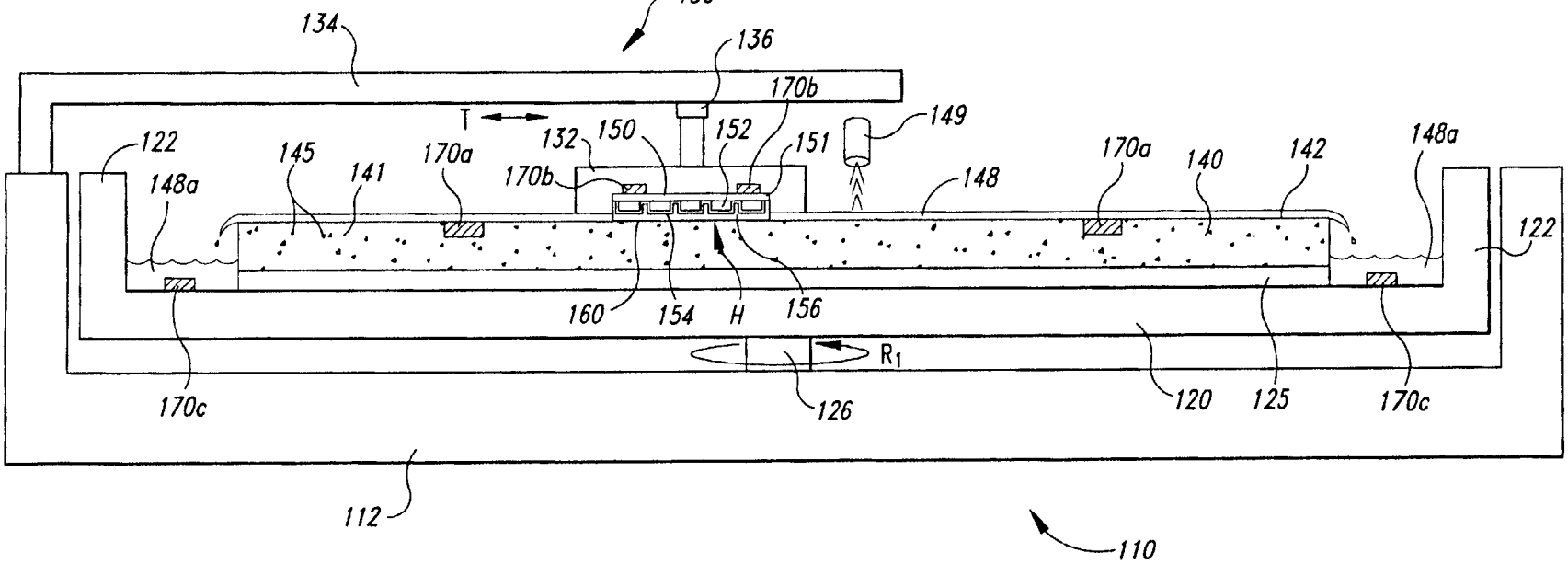
FIG. 2 is a schematic cross-sectional view of an embodiment of a polishing machine in accordance with the invention.

The preferred embodiment of the present invention is a method and apparatus for stopping mechanical and chemical-mechanical polishing of a substrate at a desired endpoint. One aspect of an embodiment of the invention is to monitor the heat between the substrate and the polishing pad at the front side of the substrate, and to stop CMP processing when the heat changes in a manner that indicates that CMP processing has reached as interface between a cover layer and an underlying layer on the substrate. Another aspect of an embodiment of the invention is to select slurries, planarizing liquids or reactive agents that produce a large change in the heat at the front side of the substrate when the underlying layer of the substrate is exposed to the polishing medium. FIGS. 2–4, in which like reference numbers refer to like parts, illustrate various embodiments of polishing methods and apparatus for stopping mechanical and chemical-mechanical polishing of a substrate at a desired endpoint in accordance with the invention.

Figure 1:
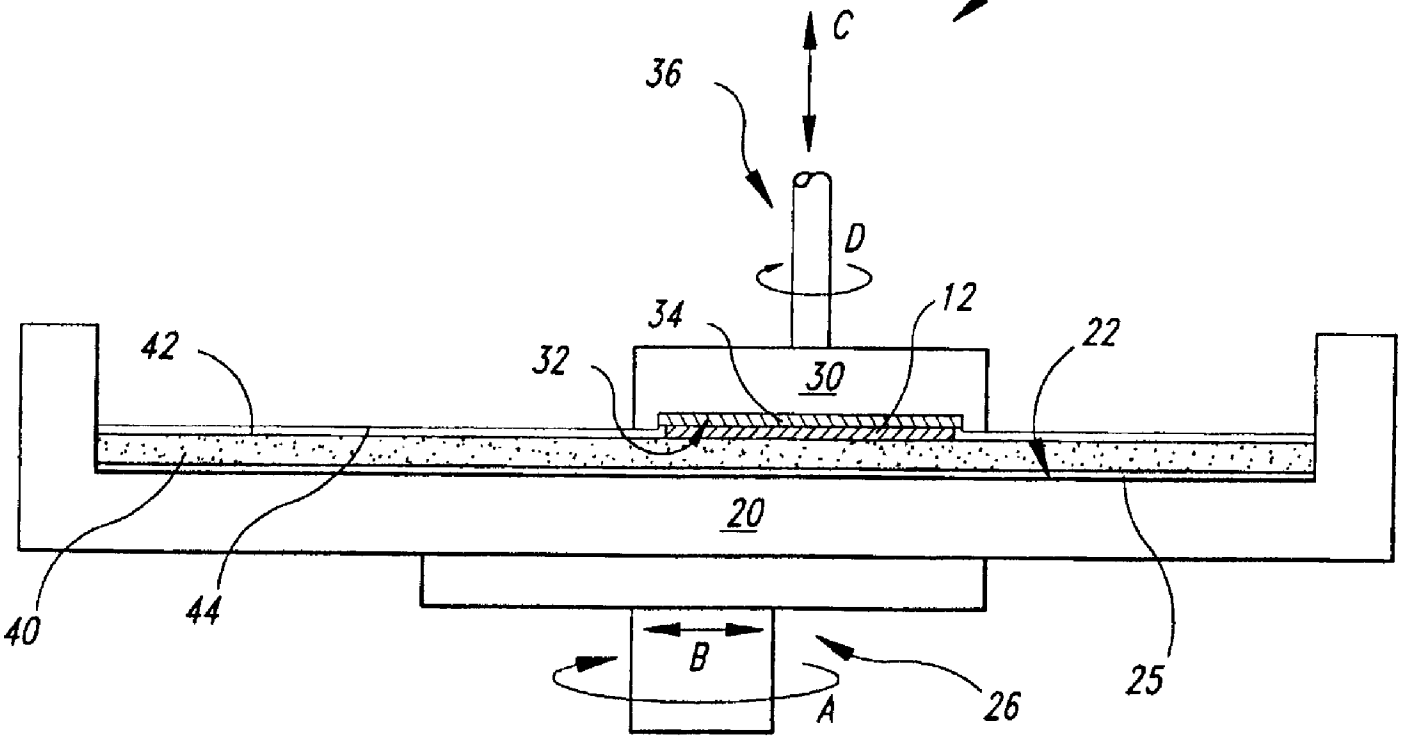
Fig. 1 (Prior Art)
FIG. 1 is a schematic cross-sectional view of a semiconductor polishing machine in accordance with the prior art.

FIG. 2 is schematic cross-sectional view of an embodiment of a polishing machine 110 for mechanical or chemical-mechanical planarization of a substrate 150. The polishing machine 110 has a housing 112, a platen 120 attached to the housing 112, and a wafer carrier assembly 130 that holds and moves a wafer carrier or chuck 132 over the platen 120. An underpad 125 is preferably attached to the platen 120, and a polishing pad 140 is attached to the underpad 125. As discussed above with respect to FIG. 1, a platen actuator 126 moves the platen 120 and a substrate actuator 136 moves the substrate carrier 132. In a preferred embodiment, the substrate actuator 136 rotates the substrate carrier 132 and moves the substrate carrier 132 along an arm 134 extending over the platen 120 (indicated by arrow T) to move the substrate 150 across the polishing pad 140.

The polishing pad 140 has a body 141 and a planarizing surface 142. In one embodiment, the polishing pad 140 is a non-abrasive polishing pad in which the body 141 is made from a matrix material. In another embodiment, the polishing pad 140 is an abrasive polishing pad in which the body 141 is made from a matrix material, and a plurality of abrasive particles 145 are bonded to the matrix material. In addition to the polishing pad 140, a planarizing liquid 148 is dispensed through a dispenser 149 onto the planarizing surface 142 of the polishing pad 140. The planarizing liquid 148 preferably has chemicals that react with one or more layer of material on the substrate 150 to enhance the removal of such layers from the substrate 150. The planarizing liquid may also have abrasive particles, such as aluminum oxide or cesium oxide, to abrade the surface of the substrate 150. In general, a particle-free planarizing liquid 148 is preferably used with an abrasive polishing pad 140, while an abrasive planarizing liquid 148 (slurry) is preferably used with a non-abrasive polishing pad 140. The planarizing liquid 148 generally flows radially outwardly across the planarizing surface 142 because the platen 120 and the polishing pad 140 typically rotate (indicated by arrow $R_1$). In one embodiment, the platen 120 has sidewall 122 spaced radially outwardly from the polishing pad 140 to catch the byproducts of the CMP process 148(a) as they flow off of the polishing pad 140.

The polishing pad 140 and/or planarizing liquid 148 define a polishing medium to remove material from the substrate 150. In the case of an abrasive polishing pad 140, either the polishing pad 140 alone defines the polishing medium or the combination of the polishing pad 140 and the planarizing liquid 148 define the polishing medium. In the case of a non-abrasive polishing pad 140 and an abrasive planarizing liquid 148 (generally a CMP slurry), the combination of the polishing pad 140 and the abrasive planarizing liquid 148 define the polishing medium. The components of the polishing medium are accordingly the items that engage the substrate to mechanically and/or chemically remove material from the substrate. As discussed in greater detail below, the heat generated at an interface 160 between the substrate 150 and the polishing medium changes as different layers of material on the substrate 150 are exposed to the polishing medium.

The polishing machine 110 also has at least one heat sensor 170 (identified only by reference numbers 170(a)–170(c) in FIG. 2) to sense the temperature of a component sensitive to the heat at the pad/substrate interface 160. A wide variety of conventional temperature sensors may be used as the heat sensor 170, including those that sense temperature optically, electrically, chemically, etc. In one embodiment, a pad heat sensor 170(a) is embedded into the polishing pad 140 to measure the temperature of the planarizing surface 142 or the planarizing liquid 148. In another embodiment, a substrate heat sensor 170(b) is connected to the substrate carrier 132 to measure the temperature at the backside of the substrate 150. In still another embodiment, a byproduct heat sensor 170(c) is coupled to the polishing machine 110 at a location to measure the temperature of the CMP byproducts 148(a). The byproduct heat sensor 170(c) is preferably attached to the platen 120 beyond the perimeter of the polishing pad 140 where the byproducts 148(a) are held after they flow off of the polishing pad 140. The byproduct heat sensor 170(c), however, may be attached to the arm 134 of the substrate carrier assembly 130 to engage the CMP byproducts 148(a) as they flow off of the polishing pad 140 (not shown).

The polishing machine 110 preferably has a plurality of heat sensors 170 with at least one heat sensor 170 attached to each of the polishing pad 140, the substrate carrier 132 and the platen 120. Thus, it is not necessary to having a single heat sensor positioned in any single one of the components of the polishing machine 110. Furthermore, it is not necessary to position a heat sensor 170 in the polishing pad 140, the substrate carrier 132 or the platen 120, but rather a heat sensor 170 may be positioned in virtually any component sensitive to heat at the pad-substrate interface 160.

Figure 3A:
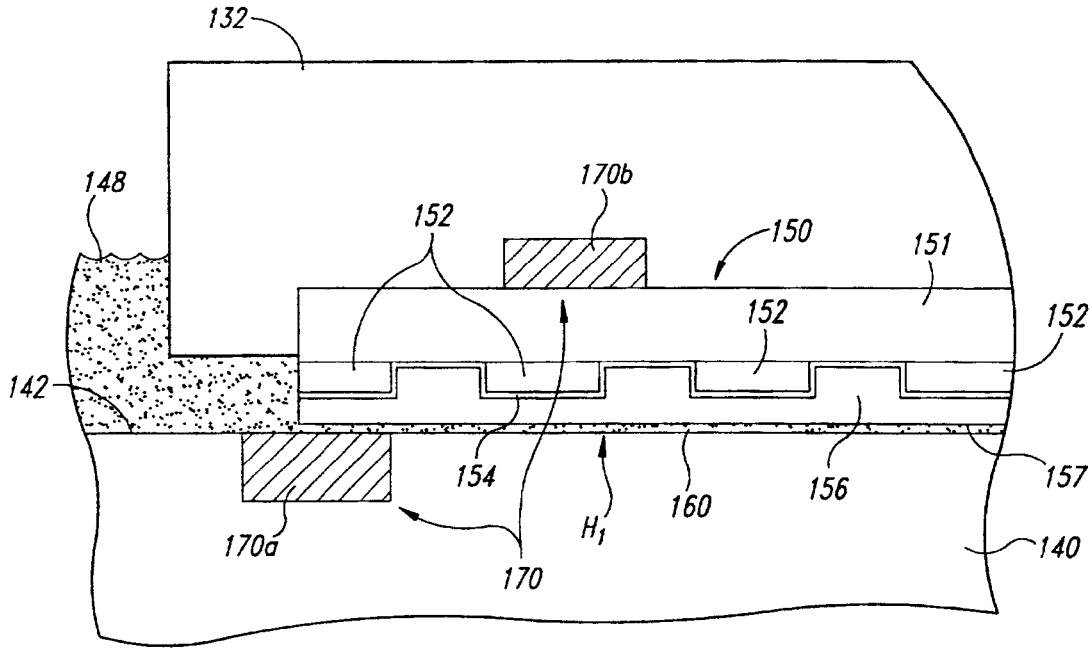
FIG. 3A is a partial schematic cross-sectional view of an embodiment of a substrate carrier and a polishing pad of a polishing machine in accordance with the invention at one point in an embodiment of a method in accordance with the invention.
Figure 3B:
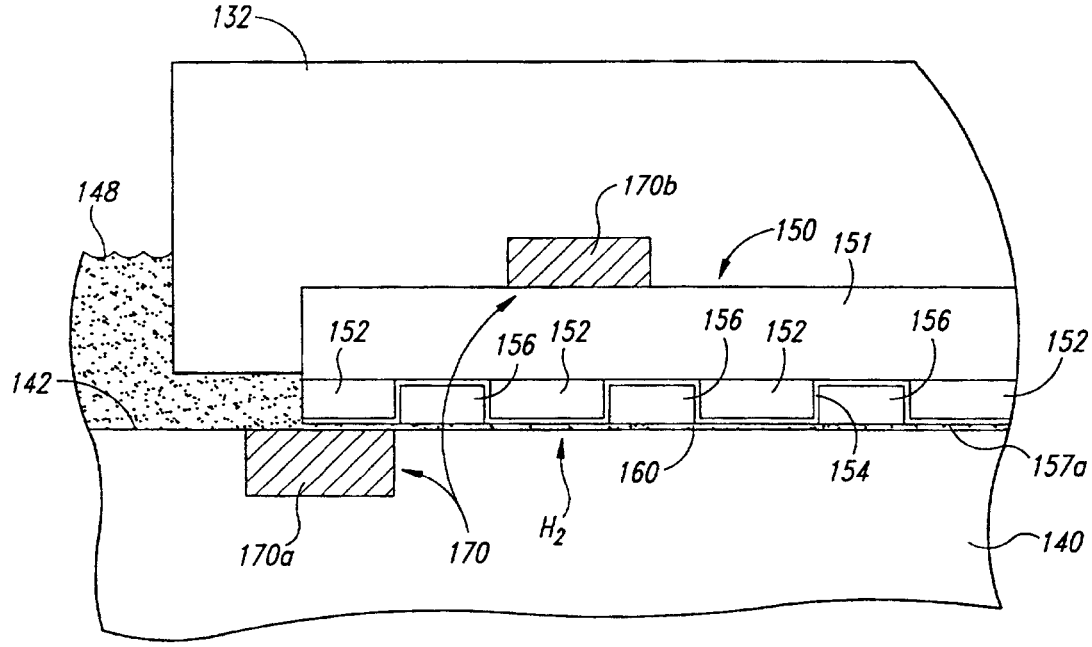
FIG. 3B is a partial cross-sectional view of the embodiment of the substrate carrier and the polishing pad of the polishing machine of FIG. 3B at a later point in the method of FIG. 3B.
Figure 4:
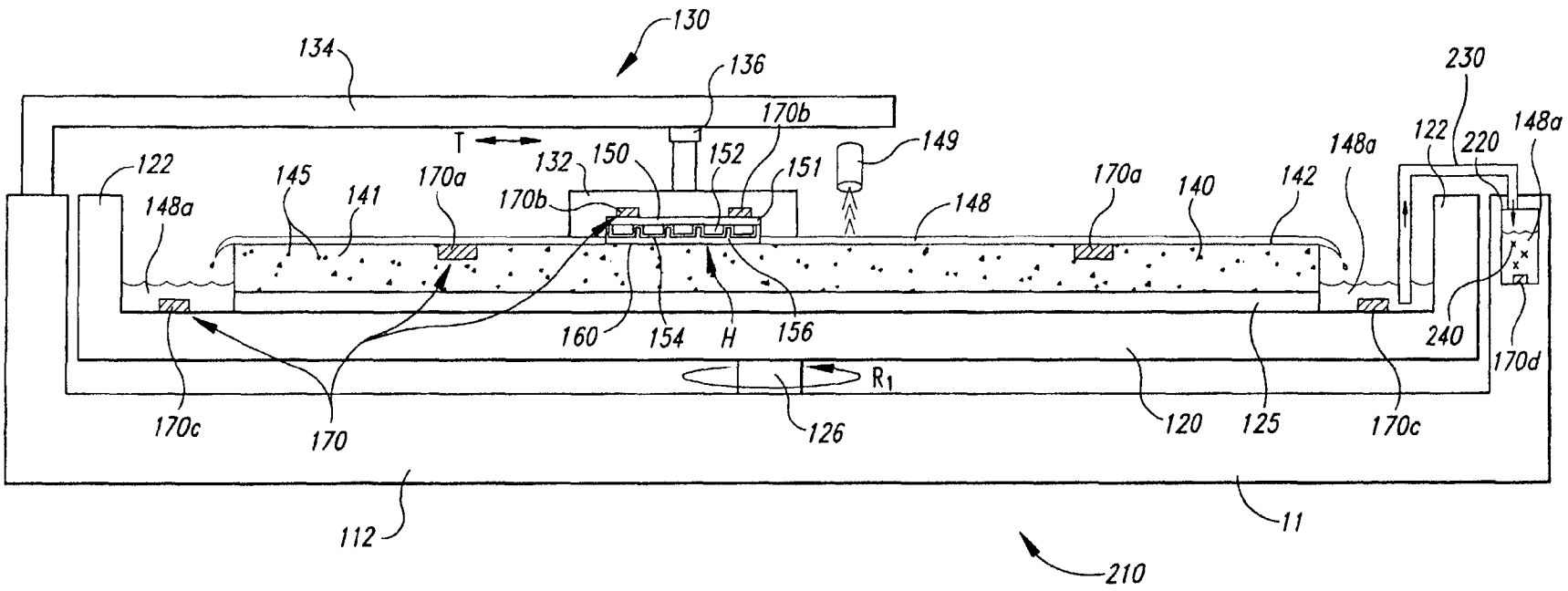
FIG. 4 is a schematic cross-sectional view of another embodiment of a polishing machine in accordance with the invention.

FIGS. 3A and 3B are partial schematic cross-sectional views of the polishing machine 110 and the substrate 150 that further illustrate the operation of the heat sensors 170(a)–170(c) in stopping CMP processing at a desired endpoint. The substrate 150 may be virtually any multiple layer device, such as a semiconductor wafer, a baseplate for a field emission display, or another type of substrate that requires a uniformly planar surface at a consistent endpoint. For example, as shown in FIG. 3A, the substrate 150 is a semiconductor wafer with a plurality of integrated circuit components 152 formed on a wafer substrate 151, an underlying conformal layer 154 formed over the integrated circuit components 152, and an insulative cover layer 156 formed over the underlying layer 154. The underlying layer 154 is preferably a polish-stop layer made from a material with a relatively low polishing rate, such as silicon nitride, diamond-like carbon and other polish-resistant materials. The cover layer 156 is preferably an inter-dielectric layer made from borophosphate silicon glass (BPSG), tetraethylorthosilicate glass (TEOS), or any other suitable insulative material. In another embodiment (not shown), the substrate 150 is a semiconductor wafer in which the underlying layer 154 is an inter-layer dielectric with vias formed over the components 152, and the cover layer 156 is a conductive layer deposited into the vias and over the underlying layer 154 to form contact plugs to the components 152. The polishing machine 110, however, may be used to accurately polish and endpoint other structure of semiconductor wafers, baseplates, and other substrates.

FIG. 3A illustrates the substrate 150 prior to the endpoint of CMP processing when only the cover layer 156 is exposed to the polishing liquid 148 and the polished pad 140. At this point in the CMP process, the friction and chemical reaction between an intermediate planarized surface 157 of the substrate 150 and the polishing medium produces a heat $H_1$ at the pad/substrate interface 160. The heat $H_1$ is a function of the material of the cover layer 156, the composition of the planarizing liquid 148, and the friction between the substrate 150 and the polishing medium. To measure the heat $H_1$ at the pad/substrate interface 160, the heat sensor 170(a) preferably senses the temperature of the polishing pad 140 or planarizing liquid 148, and/or the heat sensor 170(b) preferably senses the temperature of the substrate 150. It will be appreciated that the temperatures measured by the heat sensors 170(a) and 170(b) may not be the same, but because the temperatures at the back side of the substrate 150 and at the planarizing surface, 142 of the polishing pad 140 are both sensitive to the heat $H_1$ at the pad/substrate interface 160, the temperatures measured by the heat sensors 170 are a relative indication of the heat $H_1$ at the pad/substrate interface 160.

FIG. 3B illustrates the substrate 150 at a preferable endpoint of the CMP process when the high-points of the underlying layer 154 on top of the components 152 are exposed to the planarizing liquid 148 and the polishing pad 140. The friction and/or chemical reaction between a finished surface 157(a) of the substrate 150 at the desired endpoint produces a heat $H_2$ at the pad/substrate interface 160. The heat $H_2$ is different than the heat $H_1$ because the chemicals in the planarizing liquid 148 may react differently with the material of the underlying layer 154 than with the cover layer 156, and/or the coefficient of friction of the intermediate planarized surface 157 may be different than that of the finished surface 157(a). The heat at the front face of the substrate 150 influences the temperature of many polishing components used in the polishing process, such as the platen 120, underpad 125, substrate carrier 132, polishing pad 140, planarized liquid 148 on the polishing pad 140, substrate 150, and any other element that is sensitive to heat at the front side of the substrate. Thus, by knowing the temperatures of a polishing component corresponding to the first and second heats $H_1$ and $H_2$ at the pad/substrate interface 160, the polishing process is preferably stopped at a desired endpoint. The endpoint is preferably determined by monitoring the temperature of the polishing component and stopping the removal of material from the substrate when the temperature changes from a first temperature corresponding to heat $H_1$ to a second temperature corresponding to heat $H_2$. Accordingly, the second temperature of the polishing component preferably provides a predetermined temperature at which CMP processing is stopped.

The first and second temperatures of a polishing component generally vary as a function of several parameters, including the materials of the substrate 150, the composition of the polishing pad 140 and planarizing liquid 148, the down-force of the substrate carrier 132, and the relative velocity between the substrate 150 and the polishing pad 140. The first and second temperatures of a polishing component are preferably determined empirically for each specific CMP process by measuring the temperature of the component during polishing of a known intermediate surface 157 on a substrate and a known finished surface 157(a) on a like substrate and under like operating parameters. The actual tests to empirically determine the first and second temperatures of a given polishing component for a specific CMP process may vary and are generally known to persons skilled in the art of CMP.

The preferred embodiment of the polishing machine 110 may also be used to endpoint the CMP process at a level below the top of the underlying layer 154 because the heat $H_2$ at the pad/substrate interface 160 also varies with the extent to which the underlying layer 154 is exposed to the polishing medium. It will be appreciated that the change in heat between the first and second heats $H_1$ and $H_2$ is also a function of the surface area of the underlying layer 154 that is exposed to the polishing medium. In many polishing processes, one area of the wafer polishes faster than another so that only a fraction of the underlying layer 154 at the finished surface 157(a) is initially exposed to the polishing medium. As polishing progresses, more material is removed from the cover layer 156 to expose more of the underlying layer 154. As a result, the change in heat when the underlying layer 154 is initially exposed to the polishing medium is often different than at subsequent points in the polishing process when a different percentage of the exposed surface area on the substrate 150 is composed of the underlying layer 154. In a preferred embodiment, therefore, the heat sensors 170 indicate that the polishing process is at the desired endpoint when the temperature indicates that the heat $H_2$ at the pad/substrate interface 160 corresponds to a heat at which a sufficient percentage of the surface area on the wafer is composed of the underlying sayer 154.

In another embodiment of the invention, a reactive agent is added to the slurry or planarizing liquid 148 to increase the difference between the heats $H_1$ and $H_2$ at the pad/substrate interface 160. The particular reactive agent is selected according to the materials of the underlying layer 154, the cover layer 156, and the composition of the planarizing liquid 148. In one embodiment, the reactive agent is HCl, $NH_4OH$ or KOH for use with an underlying layer 154 made of tungsten, a cover layer 156 made of silicon dioxide and an $H_2O_2$ based planarizating liquid 148 manufactured by Rodel Corporation of Newark, Del.

A preferred embodiment of the present invention accordingly provides fast, real-time direct monitoring of the polishing status of the substrate 150. Unlike conventional endpointing techniques that remove the substrate from the polishing pad to measure a change in the thickness of the substrate, a preferred embodiment of the present invention determines the endpoint in-situ and in real-time without removing the substrate from the polishing pad and without stopping the polishing process. A preferred embodiment of the present invention, therefore, is expected to accurately endpoint CMP processing without adversely affectly the throughput of finished substrates.

Another advantage of a preferred embodiment of the present invention is that it accurately determines the endpoint of the polishing process even though the polishing parameters may change from one substrate to the next. As discussed above in the Background section, the polishing rate of a run of substrates may change from one substrate to the next for several reasons. A preferred embodiment of the present invention is expected to accurately indicate the endpoint of the polishing process even though one or more of the polishing parameters changes from one wafer to the next because the change in heat at the pad/substrate interface 160 is a function of the composition of the planarized surface on the substrate that is exposed to the polishing medium. Therefore, it is expected that a preferred embodiment of the present invention will increase the accuracy of stopping CMP processing at a desired endpoint.

FIG. 4 is a schematic cross-sectional view of another embodiment of a polish machine 210 for polishing the substrate 150. As discussed above with respect to FIG. 2, the polish machine 210 has a housing 112, a platen 120, a substrate carrier assembly 130, and a polishing pad 140. The polish machine 210 also has a reacting cell 220 preferably positioned in the housing 112, and a feed line 230 from the cell 220 to the CMP byproducts 148(a) on the platen 120. The feed line 230 is preferably movable so that it can be removed from the byproducts 148(a) and/or the interior of the platen 120 during planarization when the platen 120 rotates. In operation, the CMP byproducts 148(a) are pumped through the feed line 230 and into the cell 220 by a pump (not shown). Once a sufficient volume of CMP byproducts 148(a) is pumped into the cell 220, a reactive agent 240 is mixed with the CMP byproducts 148(a) to detect whether material of the underlying layer 154 is present in the CMP byproducts 148(a). The reactive agent 240 is preferably selected to react with the material of the underlying layer 154 in a manner that indicates the quantity of the underlying layer 154 that is present in the CMP byproducts 148(a).

Many different reactive agents 240 may be added to the cell 220 to indicate the presence and quantity of material from the underlying layer 154 in the CMP byproducts 148(a). Depending upon the specific reactive agent 240, the resulting reaction may be detected by a change in temperature in the cell 220 measured by a heat sensor 170(d), a change in color of the reacted CMP byproducts 148(a) in the cell 220, or other known techniques to monitor chemical reactions. One suitable reactive agent 240 to detect the presence of tungsten or compounds of tungsten in the CMP byproducts 148(a) is composed of potassium chlorate ($KClO_3$) and aqua regia ($HCl+HNO_3$).

From the foregoing it will be appreciated that, although specific embodiments of the invention have been described herein for purposes of illustration, various modifications may be made without deviating from the spirit and scope of the invention. For example, the heat at the front of the substrate is only one characteristic of a polishing component indicative of material being removed from the planarized surface of the substrate. When the polishing component is the CMP byproducts, the characteristics of the byproducts that may be indicative of the material at the front face of the substrate include the pH of the byproducts, the conductivity of the byproducts (especially for polishing conductive layers), the color of the byproducts, and the chemical composition of the byproducts. Predetermined values of any characteristic corresponding to the endpoint may be determined in a similar manner as described above with respect to the temperature of a polishing component sensitive to the heat at the front face of the substrate. For example, the pH level of the byproducts may be determined using a calomel electrode known in the art, or the chemical composition of the byproducts may be determined by infrared spectroscopy, elemental analysis, or atomic absorption processes known in the art. Accordingly, the invention is not limited except as by the appended claims.

I claim:

1. A method for stopping polishing of a substrate at a desired endpoint, the substrate having a cover layer and an underlying layer under the cover layer, the method comprising:

monitoring a characteristic of a polishing component indicative of material being removed from a planarized surface of the substrate, wherein the component comprises byproducts produced by polishing the substrate and the characteristic is a temperature of the byproducts, and wherein the monitoring step comprises sensing the temperature of the byproducts; and stopping removal of material from the substrate when the characteristic of the polishing component is at a predetermined value that indicates the material being removed from the planarized surface is at the desired endpoint of the substrate.

2. The method of claim 1 wherein the sensing step comprises measuring a temperature of a planarizing liquid flowing off of a polishing pad.

3. A method for stopping mechanical and chemical-mechaniical polishing of a substrate at an endpoint, the substrate having a cover layer and an underlying layer under the cover layer, and the method comprising:

monitoring heat transfer at a planarized surface of the substrate and a polishing component sensitive to heat at the planarized surface by measuring a temperature of the component, and wherein measuring the component temperature comprises sensing a temperature of byproducts produced by polishing the substrate; and stopping polishing of the substrate when the characteristic of the polishing component is at a predetermined value that indicates the planarized surface is at the desired endpoint.

4. The method of claim 3 wherein the sensing step comprises measuring a temperature of a planarizing solution flowing off of the polishing pad.

5. A method for stopping mechanical and chemical-mechanical polishing of a substrate at an endpoint, the method comprising:

detecting a change in heat at a front side of the substrate, the heat at the front side of the substrate being different when a cover layer of the substrate engages a polishing medium than when at least a portion of an underlying layer of the substrate under the cover layer engages the polishing medium, wherein detecting a change in heat at the front side of the substrate comprises sensing a temperature of byproducts produced by polishing the substrate; and stopping removal of material from the substrate when the heat is a predetermined value that indicates a desired portion of the underlying layer is exposed at the front side of the substrate.

6. The method of claim 5 wherein the sensing step comprises measuring a temperature of a planarizing solution flowing off of the polishing pad.

7. A method of stopping mechanical and chemical-mechanical polishing of a substrate at an endpoint, the method comprising:

measuring a temperature of a component sensitive to heat at a front side of the substrate, the component temperature being different when a cover layer of the substrate engages a polishing medium than when a portion of an underlying layer of the substrate under the cover layer engages the polishing medium, wherein measuring the component temperature comprises sensing a temperature of byproducts produced by polishing the substrate; and stopping removal of material from the substrate when the component temperature changes from the first temperature to the second temperature range.

8. A method of polishing a substrate, comprising:

removing material from a front side of the substrate with a polishing medium, the polishing medium being positioned at a planarizing surface of a polishing pad;

monitoring heat at the front side of the substrate, the heat at the front side of the substrate being different when a cover layer of the substrate engages the polishing medium than when at least a portion of an underlying layer of the substrate under the cover layer engages the polishing medium, wherein monitoring the heat comprises measuring a temperature of a component sensitive to heat at the front side of the substrate, the component temperature being a first temperature when the cover layer of the substrate engages the polishing medium and the component temperature being a second temperature when at least a portion of the underlying layer of the substrate engages the polishing medium, and wherein measuring the component temperature comprises sensing a temperature of byproducts produced by polishing the substrate; and stopping removal of material from the substrate when the heat at the front side of the substrate is a predetermined value that indicates a desired portion of the cover layer has been removed from the substrate.

9. The method of claim 8 wherein the sensing step comprises measuring a temperature of a planarizing solution flowing off of the polishing pad.

10. A method of polishing a substrate, comprising:

removing material from a front side of the substrate with a polishing medium, the polishing medium being positioned at a planarizing surface of a polishing pad;

detecting a change in heat at the front side of the substrate, the heat at the front side of the substrate being in a first range when a cover layer of the substrate engages the polishing medium and the heat being in a second range when a portion of an underlying layer of the substrate under the cover layer engages the polishing medium, wherein detecting the change in heat comprises measuring a temperature of a component sensitive to heat at the front side of the substrate, the component temperature being in a first temperature range when the heat at the front side of the substrate is in the first heat range and the component temperature being in a second temperature range when the heat at the front side of the substrate is in the second heat range, and wherein measuring the component temperature comprises sensing a temperature of byproducts produced by polishing the substrate; and stopping removal of material from the substrate when the heat at the front side of the substrate is in the second range.

11. The method of claim 10 wherein the sensing step comprises measuring a temperature of a planarizing solution flowing off of the polishing pad.

12. A method of polishing a substrate, comprising:

removing material from a front side of the substrate with a polishing medium, the polishing medium being positioned at a planarizing surface of a polishing pad;

measuring a temperature of a component sensitive to heat at the front side of the substrate, the component temperature being different when a cover layer of the substrate engages the polishing medium than when at least a portion of an underlying layer of the substrate under the cover layer engages the polishing medium, wherein measuring the component temperature comprises sensing a temperature of byproducts produced by polishing the substrate; and stopping removal of material from the substrate when the component temperature changes from the first temperature range to the second temperature range.

13. The method of claim 12 wherein the sensing step comprises measuring a temperature of a planarizing solution flowing off of the polished pad.

*14. A method for stopping polishing of a substrate at a desired endpoint, comprising:*

*monitoring a characteristic of a polishing component indicative of material being removed from a planarized surface of the substrate, wherein the polishing component comprises byproducts produced by polishing the substrate and the characteristic is an emission spectrum of the byproducts, and wherein monitoring a characteristic comprises analyzing the emission spectrum; and*

*stopping removal of material from the substrate when the characteristic of the polishing component that is monitored indicates the material being removed from the planarized surface is at the desired endpoint of the substrate.*

*15. A method for determining when the polishing of a substrate has reached an endpoint, the substrate having a cover layer and an underlying layer under the cover layer, the method comprising monitoring a characteristic of a polishing component indicative of material being removed from a planarized surface of the substrate, wherein the component comprises byproducts produced by polishing the substrate and the characteristic is a temperature of the byproducts, and wherein the monitoring step comprises sensing the temperature of the byproducts.*

*16. A method for determining when the polishing of a substrate has reached an endpoint, the method comprising detecting a change in heat at a front side of the substrate, the heat at the front side of the substrate being different when a cover layer of the substrate engages a polishing medium than when at least a portion of an underlying layer of the substrate under the cover layer engages the polishing medium, wherein detecting a change in heat at the front side of the substrate comprises sensing a temperature of byproducts by polishing the substrate.*

*17. The method of claim 16 wherein the temperature sensing act comprises measuring a temperature of a planarizing solution flowing off of the polishing pad.*

*18. The method of claim 14 wherein the emission spectrum is characteristic of a temperature of the byproducts.*

*19. The method of claim 14 wherein the emission spectrum is characteristic of a temperature of the byproducts and wherein analyzing the emission spectrum comprises sensing the temperature with an optical temperature sensor.*

* * * * *